United States Patent [19]

Singleton

[11] Patent Number: 5,531,494
[45] Date of Patent: Jul. 2, 1996

[54] HANDLE FOR CONTROL OF MOBILE RIDING TOYS

[75] Inventor: Ogle R. Singleton, Richmond, Va.

[73] Assignee: Singleton Technology, Inc., Richmond, Va.

[21] Appl. No.: 312,563

[22] Filed: Sep. 26, 1994

[51] Int. Cl.⁶ .................................................. B62H 7/00
[52] U.S. Cl. .................. 294/1.1; 74/551.8; 280/47.315; 280/204; 280/293
[58] Field of Search .............................. 294/1.1, 15, 19.1, 294/25, 26, 31.2, 58, 143, 149, 153, 156, 165, 170; 16/111 R, 114 R; 24/306, 442; 74/551.1, 551.8, 551.9; 81/64; 224/184; 280/1.23, 1.5, 24, 62, 204, 210, 230, 288.4, 292, 293, 304.5, 87.01, 480–482, 47.11, 47.17, 47.18, 47.315, 47.34, 47.371; 403/234, 237, 241

[56] References Cited

U.S. PATENT DOCUMENTS

| | | | |
|---|---|---|---|
| 605,799 | 6/1898 | Ripley | 280/292 |
| 1,310,651 | 7/1919 | De Long | 280/47.11 |
| 1,563,860 | 12/1925 | Jacobson | 280/482 |
| 2,645,505 | 7/1953 | Durand | 280/210 |
| 2,672,351 | 3/1957 | Kane | 280/289 |
| 2,816,775 | 12/1957 | Costello | 280/289 |
| 3,275,337 | 9/1966 | Lau | 280/87.01 |
| 3,336,048 | 4/1967 | Papucki | 74/551.8 |
| 3,485,507 | 12/1969 | Christof | 280/202 |
| 4,153,189 | 5/1979 | Hughes | 294/143 |
| 4,708,357 | 11/1987 | Soderbaum | 74/551.8 X |
| 4,903,975 | 2/1990 | Weisbrodt | 280/293 |
| 4,917,398 | 4/1990 | de Miranda Pinto | 280/293 |
| 5,028,066 | 7/1991 | Garth | 280/282 |
| 5,033,409 | 7/1991 | Sabot | 280/292 X |
| 5,154,096 | 10/1992 | Geller et al. | 74/551.8 |
| 5,180,178 | 1/1993 | Caceres | 280/47.34 |
| 5,217,240 | 6/1993 | Gardenhour, Jr. et al. | 280/282 |
| 5,259,638 | 11/1993 | Krauss et al. | 280/293 |
| 5,303,944 | 4/1994 | Kalmus | 280/288.4 |
| 5,306,030 | 4/1994 | Becka | 280/282 |
| 5,319,829 | 6/1994 | Manuel | 16/114 R |
| 5,348,327 | 9/1994 | Gieske | 280/292 X |
| 5,382,040 | 1/1995 | Nanassi | 280/293 |

OTHER PUBLICATIONS

Catalog: Sensational Beginnings, PO Box 2009 Monroe, MI 48161, Fall 1994, p. 27 Junior Trike.

Primary Examiner—Johnny D. Cherry

[57] ABSTRACT

The handle device of the invention extends from a hand hold at one end of an elongated member to a cross member at the other end. The cross member is connected to straps for ready attachment to and detachment from a child's vehicle. A pair of interengageable surfaces, such as Velcro® material, are positioned on each strap to enable the free end of the strap to be secured after being looped around a structural part of a child's vehicle. One engageable surface of the pair is fixed to the cross member, and the second engageable surface of the pair is on the free end of the strap. A pair of additional engageable surfaces for anchoring the free ends of the straps is positioned on the cross member between the parts of the straps fixed to the cross member. A duplicate of the cross member may be used for the hand hold and other purposes as well, such as connecting two vehicles together.

13 Claims, 4 Drawing Sheets

HANDLE FOR CONTROL OF MOBILE RIDING TOYS

FIELD OF INVENTION

The device of this invention is a handle which permits an erect adult-sized person to exercise various degrees of control over diverse mobile, riding-toys with or without a rider aboard.

DEFINITIONS

Herein the term "adult" is used to refer to all adult-sized persons.

The term "mobile toy" or "toy" will refer to the diverse types of mobile toys which are ridden by children among which are scooters, cars, tractors, tricycles, and front-wheel-drive bicycles with affixed training wheels.

A primary control point is a region of a toy the control of which permits the direction, propulsion and braking of the toy or toy and rider together to be controlled.

A secondary control point of a toy is a region of the toy the control of which permits the propulsion and braking of the toy or toy and rider together to be controlled.

DESCRIPTION OF THE PRIOR ART

The utility and desirability of providing a device that will permit an adult to remain erect while caring for a child on a riding toy has been recognized for a long time. Many devices have been offered to fill that need. None has been successful on a large, commercial scale although some, indeed, have found limited markets. The many prior art devices have certain common characteristics that have acted to their detriment and limited their appeal,, as is discussed below in differentiating the prior art from the article of the instant invention.

Heretofore a wide range of handles has been made to provide adults, while remaining erect, (hereafter described as "erect adult") with a means for controlling their child's mobile, rider toys especially bicycles and tricycles. One common, detrimental point to the prior art devices is that the handle is overly specialized, i.e. it works only in one position on one specific type of toy. Indeed, some control handles have been offered for sale which are attached semi-permanently to one model of one brand of one tricycle. That degree of specialization limits the time span for the use of the handle and, therefore, the appeal and value of the handle is limited.

Another common detriment to many of the prior art handles, even those characterized as removable, is that, the handles require separate, small parts (which can be easily lost during storage) and the handles require considerable time and, usually, tools for use on nuts and bolts in order for the handle to be affixed to the toy. Thus, such handles cannot be quickly and easily attached or detached for, say, the use of the toy indoors where a handle may not be needed and outdoors where the handle is needed nor can the prior art handles be used on another mobile toy of a different basic construction.

A third detriment to many of the prior art handles is that they are designed for attachment only at the rear of a mobile toy. Attachment at the rear of a mobile toy precludes use of a handle by an adult when he or she is providing the essential, initial instructional guidance in steering. Further, a rider, who is too tired to steer competently, usually must be pulled backwards by an adult using a rear-attached handle. Riding in reverse does not contribute to a positive learning experience. Also, when riderless, a toy vehicle can be more difficult to tow backwards than to be towed forward, especially over city curbs or uneven ground.

SUMMARY OF THE PRIOR ART

The prior art clearly recognizes a problem: the onerous need for adults to bend or stoop while controlling or monitoring a child on a mobile riding toy. Heretofore, the solutions to the problem have been handles overly specialized as to the mobile toy to which the handle is applicable and overly specialized as to the period of a child's experience during which the use of the handle is applicable. Further, most of the prior art devices are overly complex and require semi-permanent attachments using bolts or nuts and tools. The prior art control handles for toys do not provide a means for an adult to exercise varying degrees of control over a mobile toy or mobile toy-rider combination depending on such factors as the rider's experience, place of use, and the mobile toy itself, and all of the prior art handles must be hand held to provide control.

THE OBJECTS AND ADVANTAGES

The present invention recognizes clearly and solves the back straining problems that adults encounter when a child is learning to use or is using a mobile toy. The problems encountered stem from the fact that mobile toys are scaled for the size of their riders. Therefore, in order to achieve the necessary or desired control over the mobile toy or the mobile toy-child combination, an adult is forced from her or his normal erect posture and must bend or stoop. A bending or stooping posture is difficult to maintain for the period of time that a child would enjoy using a mobile toy. Reduction of back strain from bending or stooping is desirable, especially so should an adult be pregnant or have charge of an infant, who requires considerable lifting, as well as a young child. In the past, to avoid back strain, adults, many times, limited the use of mobile toys, particularly limiting use outside and in public areas where adult control is often desirable. Adults occasionally may permit operation of mobile toys with less control than is prudent simply because they are too tired to stay bent over.

The above, back-straining problems are solved by the present invention. The invention is a handle employing flaccid strapping which can be fastened to or unfastened from available, primary or secondary control points of diverse mobile toys and extending to a sufficient distance and elevation such that an adult, from an erect posture, conveniently can provide control over the mobile toy with or without a rider. The invention is a simple structure, portable, light in weight, easily and quickly fastened or removed from a mobile toy without tools and requires no separate parts. The degree of adult control can be adjusted depending on the control point selected, the character and the tautness of the binding between the toy and the handle and the manner in which the handle is gripped and employed by an adult.

The usefulness of the handle of the present invention is further elucidated in the following descriptions:

When a child first experiences a mobile, riding toy, adult-assisted practice is usually required for the young child to learn elementary directional control and propulsion techniques. Since new techniques are being learned, and, since new physical demands are being made, the child can tire easily. However, if the adult must bend or stoop to provide control, her or his endurance or tolerance of that posture may well be less than that of a toy-using child. With the handle of the present invention firmly bound to a primary control point of the mobile toy, an adult, from an erect posture, can provide the instructional assistance needed through use of the handle of this invention.

A tired child on a riding toy may continue to ride with enjoyment and also gain experience while an adult provides almost full control. Alternately, a tired child will ask to dismount from the mobile toy and walk, thereby depending on an adult to tow along the riderless toy. An adult without the present invention, usually, must bend or stoop while towing a toy or else lift one section of the toy in order to tow the toy and maintain an erect posture.

The degree of almost full control needed in early learning experiences is best exercised with control of the steering device which is almost universally at the front of the toy. Hence, the adult conveniently leads a toy-riding child. In all such instances the device of this invention is useful because an adult can remain erect and have a comfortable posture while providing the control and assistance desired.

As a child learns one rider toy, he or she will usually become adept at steering but still require occasional assistance and monitoring because of strength or endurance limitations or because of immature judgement. For example: an adult's control or assistance may still be needed during ascent or decent of a steep grade or near real or potential dangers. In these cases, control is desirably passed from primary, leading, control to secondary, following, control in order to foster the child's judgement and independence. A desirable, reduced degree of control is instituted by binding the present invention to an available, secondary control point of a toy with the handle elevated to provide convenient gripping by an erect adult. This latter period of toy use usually spans a much longer time than the initial learning period. Since an adult can remain erect and maintain needed control, the extent of mobile toy activities can be expanded as learning experiences for a child and as enjoyment of the scenery, chatting with friends, etc. for the adult.

Thus, I claim the following as my objects and advantages of the invention: to provide a handle that is adaptable to attach to many mobile toys with many types or dimensions of available primary and secondary control points, to provide a handle that is easily and quickly attachable or detachable without tools to available control points of mobile toys, to provide a handle that does not require separate parts, to provide a handle that enables an adult to remain erect while using said handle as a means to control a mobile toy with or without a rider, to provide a handle which requires a minimum of skill and is quick to install, to provide a handle which is easy to use, and to provide a handle which has the adaptability to be used for varying degrees of control over a mobile toy.

In addition I claim the additional objects and advantages: to provide a handle which can be attached at a first end to a control point of a mobile toy and can be attached at a second end to an adult-controlled, mobile device such as a baby carriage permitting the mobile toy, with or without a rider, to be controlled remotely from the handle and, further, to provide a handle a first end of which can be attached to an adult-controlled mobile device such as a baby carriage and a second end used by a child who needs a limited degree of support, such as one who is learning to skate, thereby relieving the mother of the need to operate the mobile device and also support the learning child.

Readers will find further objects and advantages of the invention from a consideration of the ensuing description and the accompanying drawings.

CONTROL HANDLE DESCRIPTION

Figure 1:
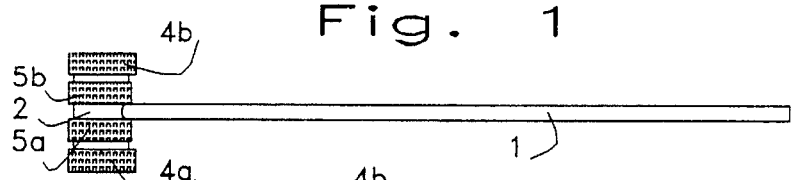
FIG. 1 is a plan view of a preferred embodiment of the handle of this invention.
Figure 2:
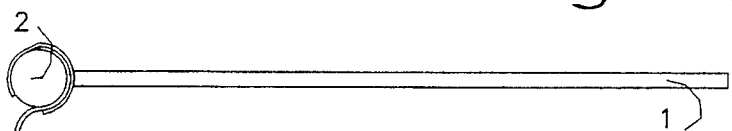
FIG. 2 is an elevation view of a preferred embodiment of the handle of this invention.

FIGS. 1 and 2 depict an embodiment of the device of the present invention which is a handle readily attachable and detachable by means of flaccid straps and without tools to many of the various types of mobile riding toys in order that an erect adult may operate the handle to exert a desired degree of control over the toy, whether ridden or not.

With reference to the drawings, in an embodiment, the device of FIGS. 1 and 2 is composed of an elongated member, 1, with a first end firmly connected at the middle of a cross member of shorter length 2. Firmly affixed to the cross member, 2, is one end section of each of two flaccid fastening straps (one hidden), 3, of the hook or loop type material such as Velcro® hook and loop material. The overall rigid length of the handle is between 0.35 and 1.8 meters.

Also firmly joined to cross member, 2, are fixed strips, 4a, 4b, 5a, and 5b, which are hook or loop type fastening strips that provide a surface that cooperatively mates with the active surface of the flaccid fastening straps and which can permit a fastening together of a portion of the free flaccid straps to a quadrant or more of the fixed strip such that, for an object bound by the fastened, flaccid strap, peel is not an easy means of unfastening without external intervention. The strips, 4a and 4b, over-lie and are secured to the respective, affixed sections of the flaccid straps 3a and 3b which are fastened directly to cross member, 2.

Figure 3:
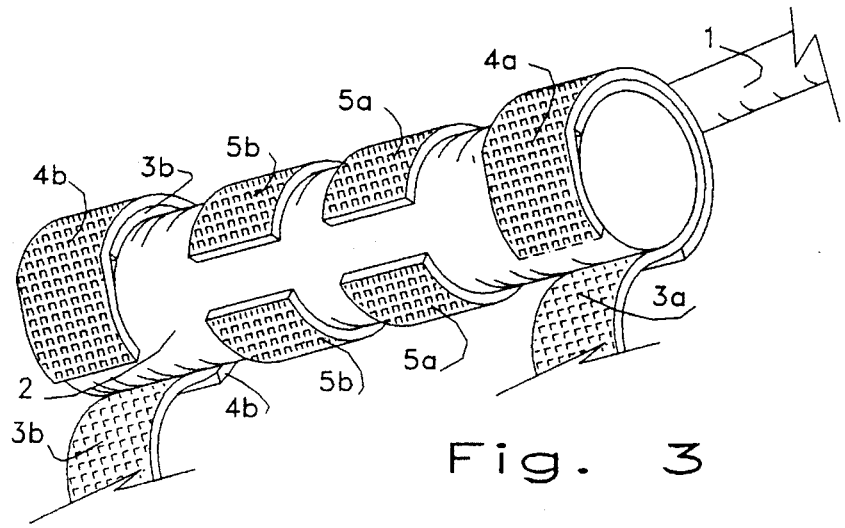
FIG. 3 is a perspective view showing the details of an attachment of the flaccid strapping and mating securing strips to a cross member in a preferred embodiment of the invention.

FIG. 3 is a perspective view showing detail of an embodiment of the cross member attachment end of the invention illustrating the relative positions and active surfaces of flaccid straps, 3a and 3b, and affixed, cooperative, mating strips, 4a, 4b, 5a and 5b.

CONTROL HANDLE ATTACHMENT

Figure 4:
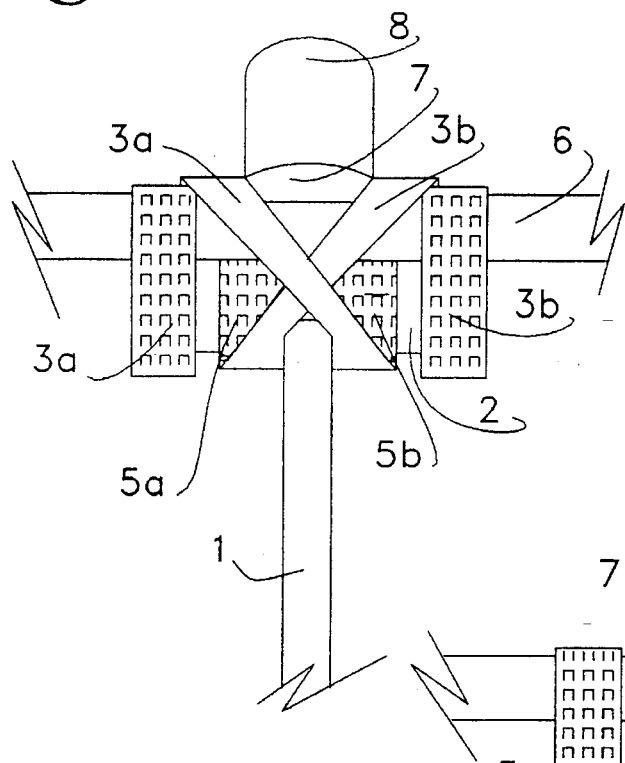
FIG. 4 is a plan view illustrating a means of binding a cross member of a preferred embodiment of the invention to a control point of a child's mobile, riding toy.

FIG. 4 is a plan view of the detail for securing a cross member of an embodiment of the instant invention, as depicted in FIGS. 1 to 3, to a handle bar of a cycle-type, mobile, riding toy. The cycle section illustrated is an end of the steering stem, 8, attached by a weld bead, 7, to the handle bar, 6, which is forward of the stem. In the arrangement of wrapping of FIG. 4 a near complete degree of control over a toy may be exercised through use of the handle by an erect adult.

The style of wrapping of FIG. 4 was achieved as follows. The cross member, attachment end, 2, of the handle was placed partially below the handle bar, 6, and centered about the stem, 8. The free section of flaccid strap, 3b, was passed from whence it emanated from the cross member, 2, under and then directly over the handle bar, 6, and, then, around the cross member fastening to the mating material thereon, i.e. the loop-strip, 4b, shown in FIGS. 1 & 3 but covered up here, and, then continuing the wrap, the flaccid strap, 3b, was cross-wrapped passing adjacent to the stem, again over the handle bar, 6, and on to the cross member, mating section material strip, 5a, fastening to 5a for a circumferential quadrant or more.

In a like manner the free section of flaccid strap, 3a, was doubly wrapped around the handle bar 6 from the opposite side.

This means of wrapping requires that, during the securing, elongate member, 1, must be maintained at an appropriate angle so that the other end of the handle, not shown, is at a comfortable elevation for the controlling adult. This wrapping style provides near-complete control of the toy such that steering is very responsive to handle movement and, to a degree, tipping over of the toy and rider can be restrained by an erect adult if required. This style of attachment is useful during the earliest learning stages of a child's use of the toy. Detachment of the invention from the mobile toy control point is easily accomplished by peeling the flaccid straps from the fixed strips in the reverse order of the wrapping.

Figure 5:
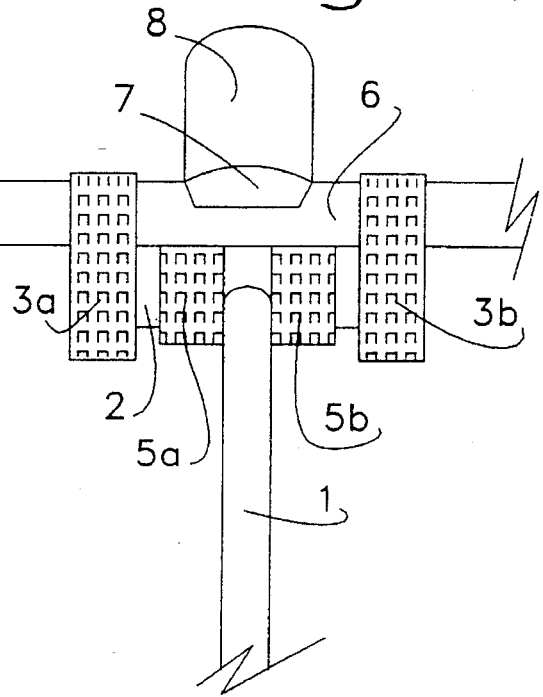
FIG. 5 is a plan view illustrating a means of a binding of the cross member of a preferred embodiment of the invention to a control point of a child's mobile, riding toy which provides a lesser degree of control of the toy than the attachment shown in FIG. 4.

FIG. 5 shows, in plan view, a wrapping style for an embodiment of the instant invention, shown in FIGS. 1 to 3, of an alternate attachment of the invention to a cycle handle bar of the type illustrated in FIG. 4. The cross member, 2, of the instant invention was placed partially below the handle bar, 6, and centered about the stem, 8, as before. The free section of flaccid strap, 3b, was passed from below directly over the handle bar, 6, and tautly around the cross member from which it originated fastening to the mating material thereon i.e. the fixed strip, 4b, shown in FIGS. 1 & 3 but covered over here, for almost a full revolution.

In a like manner the free section of flaccid strap, 3a, also was wrapped tautly around the handle bar, 6, and secured around the cross member from which it originated thereby binding the handle bar to the handle of this invention. During wrapping, elongated member, 1, was positioned so that the handle grip-end, not shown, was at an appropriate height for the controlling adult.

The quick and direct wrapping style of FIG. 5 provides an erect adult a lesser degree of control between the toy and the handle than the wrap of FIG. 4; however, the binding still is not subject to easy failure mode of peel during control of the toy through means of the handle. The binding of FIG. 5 is useful for towing a riderless toy or for assisting a child who has learned to avoid or compensate for tipping conditions but still requires steering guidance from a primary control point.

In this style of wrap attachment, should the loose ends of the flaccid straps, 3a and 3b, be in the way, the loose ends may be looped or wound around the handle bar or the handle elongated member and then attached to a convenient section of the mating strips, 5a and 5b. Detachment of the handle is by peel of the flaccid strips from the fixed strips.

Figure 6:
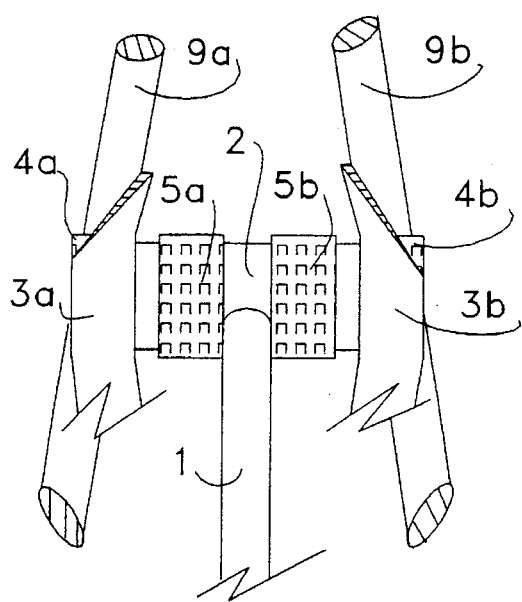
FIG. 6 is a plan view illustrating the means of attachment of a cross member of a preferred embodiment of the invention to a secondary, rear frame, control point of a child's mobile, riding toy.

FIG. 6 is a plan view of an attachment of an embodiment of the instant invention as shown in FIGS. 1 to 3 to the rear frame members, a secondary control point, of a small, front wheel driven bicycle with training wheels typified by the type taught by Goldmeier in U.S. Pat. No. 4,730,840. Two rear frame members are shown as sections, 9a and 9b. The cross member of the device of the instant invention was placed above the frame members with the elongated member, 1, pointing upwards at an angle of about 30 to 45-degrees. The free end of flaccid strap, 3a, was passed from outside and below frame member, 9a, partially around the frame member and then upwards in order for the taut strap to mate and fasten to the fixed mating strip surface, 4a, for more than a quadrant of exterior surface.

In like manner flaccid strip, 3b, was wrapped tightly about frame member, 9b, and fastened tightly to mate with over a quadrant of fixed strip, 4b.

In the style of attachment of the invention shown in FIG. 6 an erect adult using the handle has no steering control but the adult can provide motive force or restraining force as desired. That degree of control is useful for the relatively extended time period occurring after a child has mastered a mobile riding toy but while adult control still is needed for physical assistance or for controlled supervision while the child is learning judgement and when real or potential hazards may be nearby.

Figure 7:
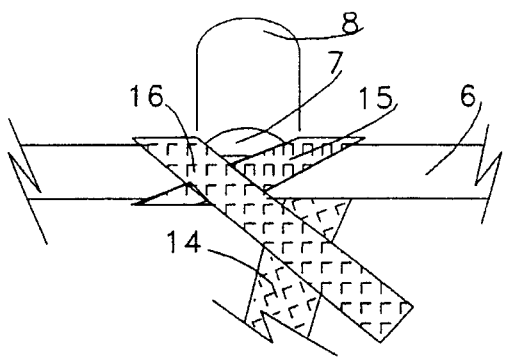
FIG. 7 is a plan view illustrating the means of wrapping a single, free, flaccid strap, of an embodiment in which both sides of the strap are covered with active hook and loop material, to form a loop to secure a control point of a toy. The elongated member component of the handle itself is not shown.

FIG. 7 shows, in plan view, the detail of a wrapping style for an embodiment of the instant invention in which only a single free, flaccid strap is affixed to a control handle. This embodiment, as shown, uses a strap which has alternate sections of hook and loop material on both sides of the strap. The wrapping shown in FIG. 7 illustrates that a control point of a toy can be bound by loops of the single free strap, the end of which is then fastened to itself. Using the cycle handle bar of the type shown in FIG. 4, the wrapping is shown as a section of free, flaccid strap, hook side up, 14, coming from the handle (not shown), passing below the handle bar, 6, and then over the said bar, loop side up, 15, and at the end of 15, at the far edge of overwrap, 16, changing to hook side up, and again wrapping below and then over the handle bar, 6, on the other side of the stem, 8, and weld, 7, becoming section, 16, hook side up and loop side down, which crosses over and fastens to the hooks of 15, below it and on to also fasten to the hook side of 14. The strap of FIG. 7 acts as a connector providing a control handle operator a not-too-sensitive steering, propulsion and braking control over the toy.

Figure 8:
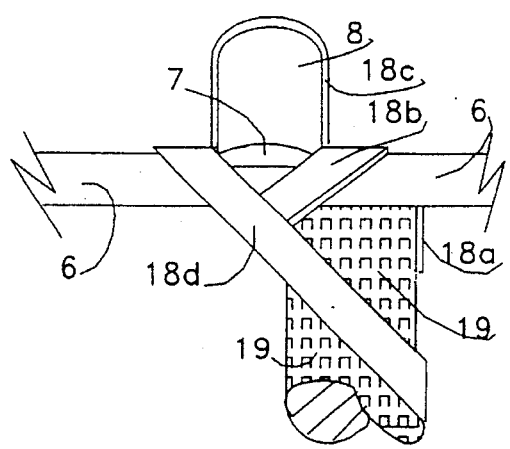
FIG. 8 is a plan view showing an elongated-member-end from which emanates a single, hook-surfaced strap which is tautly wrapped to bind a toy primary control point to the end of the elongated member; thereby providing the control handle operator control over the toy.

FIG. 8 shows the taut binding of a single, hook-type, flaccid strap to a cycle-type toy. The strap has one end section affixed with the hook side against the proximate end of the elongated member of a control handle, 1, the affixed section of strap being designated 18a. Again, as in FIG. 4, a cycle primary control point of handle bar, 6, stem, 8, and connecting weld, 7, was wrapped to the handle. The handle end shown contacted the handlebar, 6, and the free strap emanating from section 18a, passed under the said handle bar and up and over, seen as strap section, 18b, crossing under the handle bar, 6, to the left side of the stem, 8, and fully around, visible as strap section 18c, the stem, 8, and under the handle bar, 6, coming over the said handle bar as strap section 18d and passing around the said handle end a major section of which is covered with loop-surface-out mating, material, 19, thereby the free strap fastened to the handle end binds the said cycle control point to the end of the handle. An operator of a handle wrapped as shown here can exercise significant, responsive control over the toy whether ridden or not and can readily undo the fastening by peel.

CONTROL HANDLE OPERATION

Figure 9:
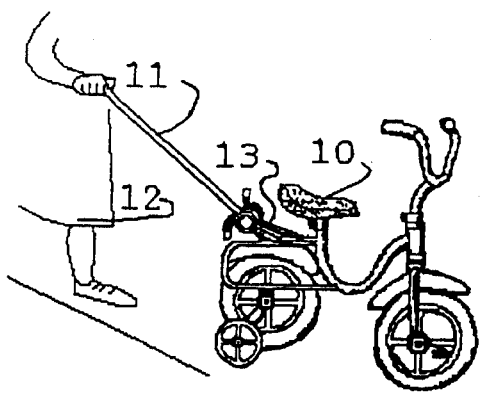
FIG. 9 is a perspective view of a preferred embodiment of the present invention in use mounted to the rear frame, a secondary control point, of a small, front-wheel-driven bike with rear training wheels. A child rider is not shown although, for proper operation in the mode shown, a rider must be present.

FIG. 9 shows an erect adult-sized person, 12, using a preferred embodiment of the handle of the instant invention, 11, bound to rear frame members, 13, of a front-wheel-drive, small bicycle with training wheels, 10. As can be seen, the handle, 11, when attached to such a rear, secondary control point, 13, cannot be used to propel the toy forward without a steering rider. It is possible for the adult to tow the riderless cycle by reversing direction from that shown here; however, that mode of towing can present difficulties when passing over rough ground or over curbs. A secondary control point is most useful for monitoring and assisting in propulsion and braking of the ridden toy when the rider has achieved a basic skill level.

Figure 10:
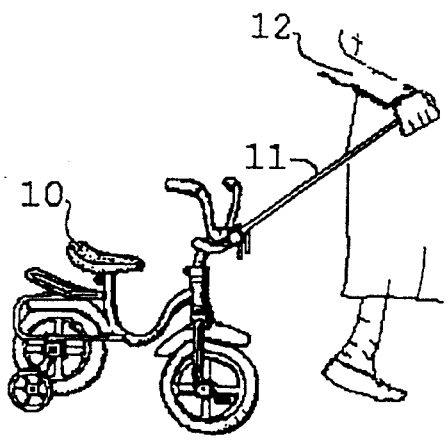
FIG. 10 is a perspective view illustrating a preferred embodiment of the present invention in use mounted to a primary control point of a small, front-wheel-driven bike with rear training wheels. In this operational mode a rider may or may not be present for acceptable operation.

FIG. 10 shows an erect, adult-sized person, 12, using a preferred embodiment of the handle of the instant invention, 11, bound to a primary control point of a small, front-wheel-drive bicycle with training wheels, 10. In this mode of operation an adult-sized person can exert almost complete control over a toy whether ridden or not. This operational mode is especially useful during the first part of a child's learning curve with a toy when an adult desires or needs to provide steering as well as propulsive or braking assistance.

SCOPE OF THE INVENTION

While the above descriptions contain many specificities, the reader should not construe the specificities as limitations on the scope of the invention, but merely as examples of preferred embodiments thereof. It can be seen that the handle of this invention is a device which provides a novel, needed and versatile means by which an erect adult can provide a desired degree of control over a child's mobile riding toy, ridden or not, thereby increasing the use of the toy and relieving the adult of the onerous necessity of bending over while providing assistance or control.

Within the scope and spirit of the instant invention are many embodiments which are understandable to those skilled in the art. For example, the elongated member, 1, and cross member, 2, of FIG. 1 may be shaped as a rod, bar, beam, or tube and be made of wood, metal, plastic or combinations thereof and fastened together by the use of such as glue, cement, screws, nails or be welded or brazed together or be molded or formed as one piece. The elongated member, 1, of FIG. 1 in another embodiment is constructed, as is known in the art, so that the cross member, 2, of FIG. 1 is integral to the said elongated member or the said cross member even may be omitted with the end of the said elongated member, enlarged or not, serving instead of the said cross member. The elongated member, 1, of FIG. 1 in another embodiment is constructed, as is known in the art, so as to be adjustable in length. In a further embodiment the connection between the elongated member, 1, and the cross member, 2, of FIG. 1 is constructed in the form of a swivel permitting the member, 1, to be adjusted about the cross member to a preferred angle of elevation and side displacement.

Figure 11:
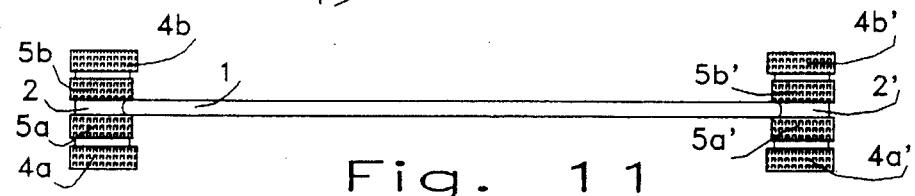
FIG. 11 is a plan view corresponding to FIG. 1 except for adding a cross member on the right end of the figure corresponding to the cross member shown at the left of FIG. 1.
Figure 13:
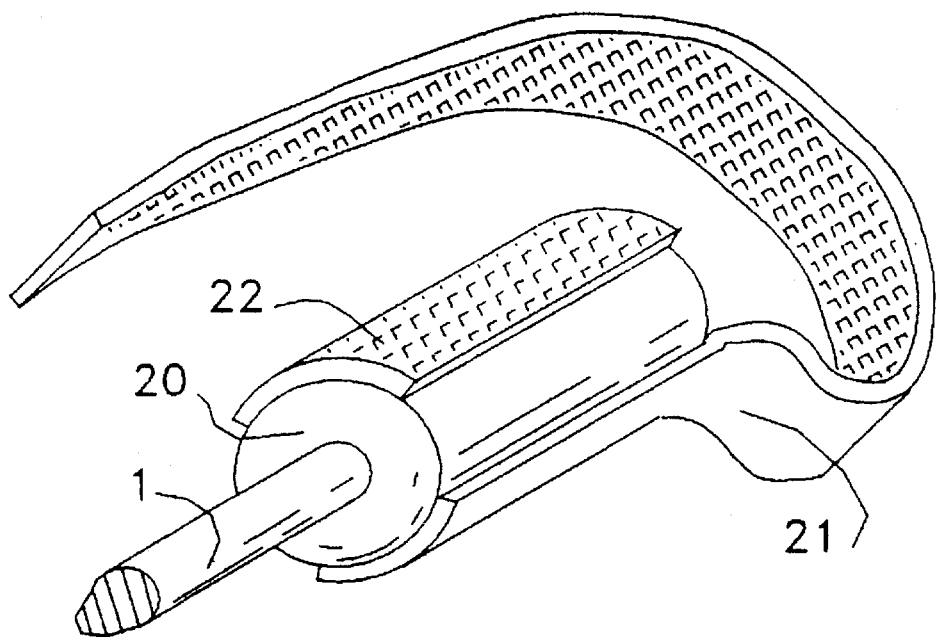
FIG. 13 is a perspective view showing one end of the elongated member surmounted by a knob which has attached a mating securing means and a fabric strap with a free end.

In other embodiments the elongated member, 1, of FIG. 1 has binding means affixed to both ends; replicate cross member 2' and binding means 4a', 4b', 5a' and 5b' at the right end (second end) of the elongated member 1 shown in FIG. 11, and including the corresponding cross member 2 and straps 4a, 4b, 5a and 5b shown in FIG. 1. In another embodiment as shown in FIG. 13 where elongated member 1 is shown only in part the binding means fixed at the second end of elongated member 1 has only a single, free end, binding strap 21 attached on one end to end knob 20 and capable of interengageable fastening with strip 22 which is also attached to knob 20. The second end can serve to facilitate gripping or can permit said second end to be attached to another object, e.g. the handle of a baby carriage which is controlled by the adult-sized individual. The two-binding-end embodiment permits the towing of a mobile riding toy and other uses without requiring the device of the instant invention to be hand-held during use.

In another embodiment the elongated member, 1, of FIG. 1 has affixed on its length binding means of the types known in the art to permit the device to be conveniently attached to a mobile object such as a baby carriage handle for storage when not in use but assuring readiness for use.

Figure 12:
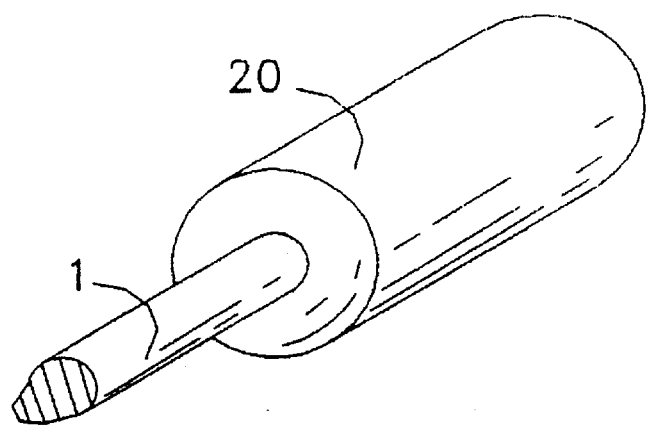
FIG. 12 is a perspective view showing one end of the elongated member surmounted by a knob to aid in holding.

In other embodiments the elongated member, 1, of FIG. 1 has affixed, proximately to one end a type of human-hand, grip-enhancing device many types of which are well known in the art as shown in FIG. 12 by the knob 20 attached to the second end of elongated member 1 which is illustrated only in part.

It should be understood that the hook and loop strips are exemplary and preferred means of fastening and, within the spirit of the invention, those strips can be replaced by other flaccid strapping means attached to the cross member such as a belt and buckle straps. At the simplest, the cross member can be omitted and the elongated member provided at an end with at least one suitably sized hole with at least one length of rope or the like passing through the hole for use as a fastening tie to secure the toy to the elongated member. Flaccid strapping means provide for fastening on diverse types and sizes of mobile toys with various primary or secondary control points. It has been found in practice with prototype control handles that the handle is operational with only an elongated member and a single free, flaccid strap; however, the use of two or more free, flaccid straps emanating from a cross member provides somewhat better control and seems applicable to a wider number of toys.

In another embodiment the flaccid strips, 3a and 3b, of FIG. 3 are of mating hook and loop materials; i.e. 3a is, say, loop material and, then 3b is hook material. This permits the straps to be extended around large control regions and fastened together by overlapping the strap ends thereby securing the cross member of the invention to the toy. When so wrapped, a primary control point usually is not sufficiently controlled to permit steering, as opposed to crude guidance, by means of the handle. When this embodiment is used, and referring to FIG. 3, if the free strip, 3a, is loop material, then the affixed strips, 4a and 5b, are preferably hook material, and also, if the free strip, 3b, is hook material then preferably the affixed strips, 4b and 5a, are loop material. Other designs for securing hook-and-loop attachment means such as that taught by Pileggi in U.S. Pat. No. 5,289,619 are well known in the art and may be employed rather than the means illustrated herein. As known in the art the free, flaccid strapping of the hook and loop type can have both sides active material and can be fastened together in many diverse ways such as those taught by Flynn in U.S. Pat. No. 4,862,563.

SUMMARY

The present invention provides a handle that permits an adult to remain in a comfortable, erect posture while providing instructional control or monitoring control to a child using any of many types of mobile riding toys. The present invention is also useful to permit an erect adult conveniently to tow a riderless mobile riding toy of many types. Maintenance of an erect adult posture permits an adult to enjoy a child's use of a mobile riding toy and relieves the adult of the discomfort of remaining in a stooped or bent position or of the strain of having to lift a portion of a riderless toy to tow it.

The handle with flaccid strap binding means is self contained and provides for quick and easy attachment and detachment without tools. The fastening means of a preferred embodiment uses for the flaccid, free straps and mounted, cooperative, mating fastening-strips material of the Velcro® type which permits secure attachment of the handle to the toy with the low strength, peel mode of detachment requiring manual intervention.

What I claim is:

1. A handle device suitable for convenient attachment to and detachment from a child's vehicle for external control by an adult, comprising:

a component holdable by hand for controlling the device;

first and second straps for binding the device to part of a child's vehicle;

strap mounting means fixed to and supporting part of each strap;

means connecting said hand holdable component to the strap mounting means;

each strap having a free end extending from where the strap is fixed to the mounting means;

a pair of different surfaces on each strap which is capable of interlocking and thereby mating when pressed into face to face engagement with each other and of unlocking when peeled apart;

the first of said surfaces of each strap being outwardly facing and located, at least in part, on said part of the strap which is fixed to said mounting means;

the second of said surfaces of each strap being on the free end of the strap; and the free end of each strap being capable of being extended out to connect with a child's vehicle and looped back to bring its said second surface into face to face interlocking engagement with said first surface of at least one of said straps.

2. The handle device of claim 1, in which the second surface on the free end of each strap is capable of mating with a said first surface of the same strap.

3. The handle device of claim 1, in which said first surfaces each have the same mating form and capability, thereby enabling said second surface on the free end of each strap to be mated with said outwardly facing first surfaces of the same strap and of the other strap.

4. The handle device of claim 1, comprising a pair of additional outwardly facing surfaces on the strap mounting means, one of said additional surfaces extending along and spaced in one direction from one side of one strap and the other additional surface extending along and spaced in the opposite direction from the other side of the other strap, one of said additional surfaces being capable of mating with the said second surface on the free end of one of the straps, and the other of said additional surfaces being capable of mating with said second surface on the free end of one of the other straps.

5. The handle device of claim 4, in which both of the said surfaces on the free ends of the strap have the same mating capability as the other, and said outwardly facing second surfaces on the straps and said additional surfaces all have the same mating capability as each other, and in which said second surface on the free end of each strap may be brought to engage and interlock with each of said outwardly facing first surfaces on the straps and with said additional surfaces.

6. The handle device of claim 4, in which said additional surfaces are between said outwardly facing first surfaces on the straps.

7. The handle device of claim 1, in which the exterior of said mounting means is outwardly curved where it supports the part of each strap which is fixed to the strap mounting means and said outwardly facing first surface of each strap extends at least a quarter of the way around the adjacent periphery of the strap mounting means.

8. The handle device of claim 1, in which said connecting means extends straight to the strap mounting means, the strap mounting means has a generally cylindrical exterior and is connected in the middle of its axial length to said connecting means, the axis of said cylindrical surface is at substantially right angles to the straight length of said connecting means and said two straps are fixed to the mounting means on opposite sides of the connecting means.

9. The handle device of claim 1, in which said component holdable by hand is substantially in the form of a duplicate of said cylindrical strap mounting means and said straps mounted thereon.

10. The handle device of claim 1, in which the mating surfaces of each pair are of two kinds, the mating surfaces of one kind comprising hooks and the mating surface of the other kind comprising loops.

11. A handle suitable for an erect, adult-sized person to exercise at least a degree of control over a child's mobile riding toy comprising:

a holding means comprising at least two rigid members:
a first elongated member having two ends;

a second, shorter cross member fixed at a first end of the said first member in a crossed axis relationship;

a means to bind an open offset part of a child's mobile riding toy to the said cross member comprising two parts:
- a first part comprising at least two Velcro® type straps with one end portion fixed to the cross member and with the attaching surface contacting the cross member, and capable of being extended away from the said first elongated member;
- a second part comprising at least two strips of Velcro® type material, attaching surface mating with the said Velcro® type straps and disposed outwardly, of length at least half the external cross section of the cross member and each strip, at least in part, fixed to the said cross member;
- where each strap of the said first part binding means is capable of being looped about a portion of said open offset part of a child's mobile riding toy and extends such that a length of each strap's attaching surface is capable of being pressed into surface to surface interlocking engagement with said second part binding means over at least a quadrant of the cross section of the said cross member,
- whereby a child's mobile riding toy may be effectively bound to the said cross member with a second end of the said first elongated member at a convenient distance and height to be grasped by an erect, adult sized person to control to some degree a child's mobile riding toy whether ridden or not.

12. A handle of claim 11 further comprising a means for increasing the ease with which a human hand can grip a second end of the said elongated member comprising:

a knob type protruberance surmounting the said second end of the said elongated member.

13. A handle of claim 11 further comprising a means for attachment of a second end of the said elongated member to a child transport vehicle in which

- a knob type protruberance having a first side and an opposite side surmounts the said second end of the said elongated member, and
- a strip of Velcro® type fabric having two ends and one attaching surface is fixed at both ends to a first side of the said knob type protruberance, attaching surface exposed;
- a strap of Velcro® type fabric having two ends and one attaching surface has a first end portion, attaching surface inward, fixed to an opposite side of the said knob type protruberance, and
- a free portion capable of extending away from the handle mass, and
- capable of being looped about a portion of an open offset part of a child's transport vehicle and then have the attaching surface capable of being pressed into surface to surface interlocking engagement with the said strip of Velcro® type fabric fixed to the said knob type protruberance
- whereby the said second end of the said elongated member may be effectively attached to a child transport vehicle.

* * * * *